United States Patent
De Bondt

(10) Patent No.: US 10,939,698 B2
(45) Date of Patent: Mar. 9, 2021

(54) SUGAR-REDUCED FROSTED CEREAL PRODUCT

(71) Applicant: TIENSE SUIKERRAFFINADERIJ N.V., Brussels (BE)

(72) Inventor: Veerle De Bondt, Jodoigne-Souveraine (BE)

(73) Assignee: TIENSE SUIKERRAFFINADERIJ N.V.

( * ) Notice: Subject to any disclaimer, the term of this patent is extended or adjusted under 35 U.S.C. 154(b) by 157 days.

(21) Appl. No.: 14/387,526

(22) PCT Filed: Mar. 25, 2013

(86) PCT No.: PCT/EP2013/000891
§ 371 (c)(1),
(2) Date: Sep. 23, 2014

(87) PCT Pub. No.: WO2013/139488
PCT Pub. Date: Sep. 26, 2013

(65) Prior Publication Data
US 2015/0093476 A1      Apr. 2, 2015

Related U.S. Application Data

(60) Provisional application No. 61/644,310, filed on May 8, 2012.

(30) Foreign Application Priority Data

Mar. 23, 2012 (EP) .................................... 12002081
Apr. 19, 2012 (EP) .................................... 12002740

(51) Int. Cl.
| | | |
|---|---|---|
| A23L 7/117 | (2016.01) |
| A23L 7/191 | (2016.01) |
| A23L 29/30 | (2016.01) |
| A23P 20/12 | (2016.01) |
| A23L 7/00 | (2016.01) |
| A23L 7/161 | (2016.01) |
| A23L 33/20 | (2016.01) |
| A23L 7/143 | (2016.01) |
| A23L 7/122 | (2016.01) |

(52) U.S. Cl.
CPC ................. *A23P 20/12* (2016.08); *A23L 7/00* (2016.08); *A23L 7/117* (2016.08); *A23L 7/122* (2016.08); *A23L 7/143* (2016.08); *A23L 7/161* (2016.08); *A23L 7/191* (2016.08); *A23L 29/30* (2016.08); *A23L 33/20* (2016.08); *A23V 2002/00* (2013.01)

(58) Field of Classification Search
CPC .......... A23L 7/117; A23L 7/161; A23L 7/191; A23L 29/30; A23L 33/20; A23L 7/143; A23L 7/122; A23P 20/12
See application file for complete search history.

(56) References Cited

U.S. PATENT DOCUMENTS

| | | | | |
|---|---|---|---|---|
| 4,089,984 A | * | 5/1978 | Gilbertson | A23L 7/122 426/103 |
| 4,761,292 A | | 8/1988 | Augustine et al. | 426/321 |
| 4,859,477 A | * | 8/1989 | Augustine | A23L 29/212 426/103 |
| 5,258,187 A | * | 11/1993 | Shimada | A23G 3/343 426/291 |
| 6,664,389 B1 | * | 12/2003 | Shi | C08B 30/12 127/32 |
| 8,691,304 B2 | | 4/2014 | Fritzching et al. | 426/93 |
| 2008/0102164 A1 | * | 5/2008 | Fritzsching | A23L 7/126 426/72 |
| 2012/0003360 A1 | | 1/2012 | Barrett et al. | 426/93 |
| 2012/0121773 A1 | * | 5/2012 | Vande Giessen | A23G 3/343 426/289 |
| 2013/0323377 A1 | | 12/2013 | Kowalczyk et al. | 426/293 |

FOREIGN PATENT DOCUMENTS

| | | | |
|---|---|---|---|
| DE | 102005010834 | 9/2006 | |
| DE | 202009007393 | 7/2010 | ............... A23G 3/00 |
| EP | 2025245 | 2/2009 | ............... A23L 1/00 |
| JP | 2008531063 | 8/2008 | ............... A23L 1/09 |
| JP | 2010535478 | 11/2010 | ............... A23G 3/00 |
| WO | WO0042865 | 7/2000 | ............... A23L 1/00 |
| WO | WO2012003282 | 1/2012 | ............... A23B 7/08 |

OTHER PUBLICATIONS

International Search Report issued in corresponding application No. PCT/EP2013/000891, dated Sep. 10, 2013 (3 pgs).
Japanese Office Action issued in application No. 2015-500800, dated Jun. 16, 2016 (6 pgs).

* cited by examiner

*Primary Examiner* — Katherine D Leblanc
(74) *Attorney, Agent, or Firm* — Hayes Soloway P.C.

(57) ABSTRACT

A frosted cereal product includes a cereal base and a frosting on the cereal base. The frosting is a composition containing a sugar, in an amount of at most 90% by weight (dry matter of the frosting), and a raw starch, in an amount of at least 10% by weight (dry matter of the frosting); the weight ratio between the cereal base and the frosting lies between 1:0.05 and 1:2; and the frosting consists of 1 to 5 layers.

19 Claims, No Drawings

SUGAR-REDUCED FROSTED CEREAL PRODUCT

FIELD OF THE INVENTION

The invention relates to a frosted cereal product, comprising a cereal base and a frosting on the cereal base. The invention further relates to a method for the preparation of a frosted cereal product.

BACKGROUND OF THE INVENTION

Frosted cereal products and compositions for imparting a frosted appearance to a cereal base are known in the art. The known frosting typically comprises mainly sugar, more particular sucrose (saccharose), partly in crystalline form. This is in contrast to a "glazing", which consists essentially of a non-crystalline amorphous glass of a sugar or the like. A frosting on a cereal base not only contributes sweetness but also crunch and an appealing appearance to the cereal product. A well-known example is frosted corn flakes, such as for example "Frosted flakes"™ or "Frosties"™ by the Kellogg Company™. As meant herein, a frosting is a specific form of a coating, since a frosting should not only provide a coating functionality but also a—usually inhomogeneous—appearance functionality (often partly whitish) and often also an organoleptic functionality such as crunch. While frosted cereal products are widely accepted by the consumer, one disadvantage resides in the particularly large amount of high glycemic sugar which is present in known frosting syrups and is thus introduced onto the cereal base. A common composition for the frosting of cereal products comprises sucrose in an amount of about 80% by weight of the coating syrup, which amounts to nearly 100% of the dry matter of the frosting.

There is an increasing demand for more healthy cereal products characterised in a reduced content of high glycemic compounds such as sucrose. Therefore, there is a need in the food industry for frosting compositions that are reduced in high glycemic components over known sucrose-based frosting compositions. Disadvantageously, however, a simple reduction in the content of sucrose or (full or partial) substitution by low glycemic sugars, such as isomaltulose, or by sugar alcohols, such as isomalt, considerably decreases the quality of the obtainable frosting, in particular in terms of the crunch, the typical crystalline "frosted" white appearance and the storage stability of the frosted product.

It is an object of the present invention to provide a composition for the frosting of a cereal base which comprises a reduced amount of high-glycemic sugar as compared to known sucrose-based frosting compositions but confers similar or even improved one or more of: organoleptic and sensoric properties, white appearance, and storage stability, as compared to known sucrose-based frostings.

SUMMARY OF THE INVENTION

The object of the present invention is achieved by providing a frosted cereal product, comprising a cereal base and a frosting on the cereal base, whereby:
   the frosting consists essentially of a composition comprising a sugar, in an amount of at most 90% by weight (dry matter of the frosting), and a raw starch, in an amount of at least 10% by weight (dry matter of the frosting);
   the weight ratio between the cereal base and the frosting lies between 1:0.05 and 1:2; and
   the frosting consists of 1 to 5 layers.

It was found, surprisingly, that the presence of raw starch in a frosting can contribute to desirable properties of the frosting such as crunch and appearance.

WO-A-2012/003282 discloses improved sugar coatings for topically pre-sweetened food products that are sugar reduced whether in the form of a syrup or in the form of a dried coating. The syrup form is useful as an intermediate product in the preparation of pre-sweetened food products. In dry form, the present formulations can be a component part of a composite food product especially in the form of a topical coating or filling. The present invention is particularly suited for the preparation of R-T-E pre-sweetened cereals. The coating formulations comprise less than 70% sucrose, corn syrup and 1-20% non-hydrated integrated starch and preferably about 5-10% insoluble mineral salts each of particle size of about 50 microns. WO-A-2012/003282 discloses that a frosted appearance can be obtained by adding small amounts of titanium dioxide ($TiO_2$).

DETAILED DESCRIPTION OF THE INVENTION

As used herein, the terms 'essentially', 'consist(ing) essentially of', 'essentially all' and equivalents have, unless noted otherwise, in relation to a composition or a step in a method the usual meaning that deviations in the composition or step may occur, but only to such an extent that the essential characteristics and effects of the composition or step are not materially affected by such deviations.

The frosted cereal product of the invention comprises a cereal base. A cereal base is as such known and may take the form of for example granola bars, energy bars and breakfast products, particularly clusters, granola, salty snacks, flakes such as corn flakes, puffed corn, puffed rice, loops, balls, bite-size pieces, flakes or crispies.

In the present invention, the cereal base is preferably selected from the group of breakfast cereals, including corn flakes and other flaked or extruded cereal compositions, such as loops, pops or brans, for example, honey loops, corn pops, oat bran, clusters and the like. The cereal base to be frosted in accordance with the invention is not limited thereto. It also includes other cereal bases such as oat meal. In further embodiments the cereal base is a ready-to-eat cereal such as a cereal bar. In the cereal product some or all cereals may be bound together by means of binders and/or glass of sugar or sugar alcohols.

The frosted cereal product of the invention comprises a frosting, whereby the frosting consists essentially of a composition. The composition for frosting comprises a sugar, preferably in an amount lying between 5 and 90 wt. % (based on the total dry matter of the frosting). In a main embodiment of the composition for frosting, the sugar is a high glycemic sugar, in particular sucrose and/or glucose, in particular sucrose; the sugar is preferably present in the composition in an amount lying between 10 and 80 or 70%, more preferably between 15 and 65 or 60 or 50% by weight of the dry matter of the composition. As meant herein, the term 'high glycemic sugar' means a sugar having a glycemic index (GI) that is equal to or higher than the GI of sucrose.

In another main embodiment of the composition for frosting, the sugar is a low glycemic sucrose-isomer, preferably isomaltulose; the sugar is preferably present in the composition in an amount lying between 10 or 15 and 90%, preferably less than 85%, preferably less than 80% by weight of the dry frosting. As meant herein, the term 'low glycemic sugar' means a sugar having a glycemic index (GI) that is lower than the GI of sucrose.

In a preferred embodiment of the composition for frosting, the sugar is a mixture of a high glycemic sugar and a low glycemic sugar, whereby the weight ratio between the high glycemic sugar such as for example sucrose and the low glycemic sugar such as for example isomaltulose lies between 95:5 and 5:95, more between 90:10, 80:20, or 70:30 and 10:90, 20:80, or 30:70. This has the advantage that an optimisation of the glycemic index of the frosting can be combined with an optimisation of other properties of the frosting such as for example hygroscopic behaviour, appearance, and crunch.

The composition of the invention comprises at least 10 wt. %, as calculated on dry matter of the composition, of raw starch. As meant herein, the term 'raw starch' refers to a starch that is uncooked, also referred to as a 'cook-up' starch. As the person skilled in the art knows, unmodified raw starch granules show, when viewed with a microscope under polarized light, a Maltese cross effect. Furthermore, as meant herein the term 'raw starch' also encompasses starches that have been treated or modified while however retaining a granular structure. This is in contrast to starches that are not raw starches, these are in particular starches that have been treated or modified with the purpose of displaying solubility or gelatinisation effects in aqueous systems already at low temperatures, i.e. temperatures below the original gel point of the raw starch; such starches are often referred to as pregelatinised or cold-soluble starches.

In preferred embodiments, the raw starch is present in the composition in an amount of at least 15%, 20%, 25%, or 30% by weight of the dry matter of the composition for frosting. Preferably, the raw starch is present in the composition in an amount of at most 50%, 45%, or 40% by weight of the dry matter of the composition for frosting.

Preferably, the amount of raw starch in the frosting as a whole lies between 10, 15, 20, 20 or 30 and 50, 45, or 40 wt. % (dry matter).

In a preferred embodiment of the invention, a starch which exhibits a high gel point is used. According to the invention, this helps to prevent gelification of the starch during the preparation of the frosting syrup as well as throughout the coating and frosting process. Preferably, significant gelification of the raw starch within the composition should according to the invention be prevented at all stages of the frosting process.

Preferably, the raw starch present in the composition of the invention has a specific gel point of at least 65, 66, 67, 68, 69, or 70° C., or even at least 71, 72, 75, 80, 85, 90, 95, or 100° C. The determination of the specific gel point, also referred to as starting gel point, by means of a rheological measurement is well-known to the person skilled in the art. For the purposes of the present invention, the specific gel point determination of a starch was done in a Brabender Viscoamylograph, using water with 8 wt. % of the starch; the starting temperature was 50° C., the heating rate up to 95° C. was 3° C. per minute, the holding time at 95° C. was 15 minutes, followed by cooling at a rate of 3° C. per minute until the end temperature of 20° C.

It is not automatically necessary, however, that the temperature of the composition for frosting according to the invention must not exceed the specific gel point of the raw starch. In the composition of the invention, the presence of the sugar can cause the raw starch to remain in its raw state, even if the temperature of the composition—e.g. during its application onto a cereal product or during a drying step thereafter—rises above the specific gel point of the starch. In such circumstances, the starch is said to have a relative gel point. In typical embodiments of the invention, the relative gel point of the raw starch within the composition rises by about 5° C. per 10% by weight (as calculated on the composition as a whole) increase of the sugar content. For example, for a composition comprising sugar in an amount of 60% by weight, the increase in the amount of sugar to 70% by weight would increase the relative gel point of the raw starch included in the composition by about 5° C. Advantageously, therefore, the composition of the invention can be processed at temperatures above the specific gel point of the starch without inducing its unwanted gelification.

In a particularly preferred embodiment the raw starch used is a raw starch of particularly high purity, in particular having a purity of at least 90, 95 or 97% starch, preferably at least 98%, preferably 99% starch (based on the dry weight of the raw starch).

In a preferred embodiment of the present invention the raw starch is powdered.

The invention provides a composition where a considerable part of the major bulking coating and frosting compound, i.e. a sugar, is replaced or substituted by raw starch. According to the invention, raw starch advantageously contributes to one or more of: the organoleptic properties, sensoric properties, a white appearance, and the storage stability (shelf life) of the frosting and of the whole frosted cereal product. For example, the frosting so obtained can exhibit an appealing white "frosted" appearance, a reduced tendency for water-uptake during storage, as well as a reduced stickiness of the frosted product. It has been found that with the addition of starch in its raw form, the formation of the frosting directly from a coating syrup is possible, whereas without the replacement of the major bulking coating/frosting compound with raw starch a frosting would be less likely to occur, if at all.

Moreover, the presence of raw starch within the composition provides for a frosting on a cereal base wherein the sugar-reduced frosting obtained is comparable and closely resembles the organoleptic and sensoric properties, white appearance and/or storage stability of known sucrose-based frostings, or even improves on the characteristics of known frostings.

The contribution by the raw starch in a sugar-reduced frosting composition particularly allows the formation of an appealing white frosting on the cereal base, which cannot be achieved by an ordinary frosting composition which is merely reduced in the amount of sugar alone. Sugar-reduced frosting compositions without the addition of raw starch exhibit a reduced capability of forming a crystalline frosting. More particularly, and with reference to the enclosed examples, sugar-reduced frosting compositions without the addition of raw starch are known to often not form frostings at all.

In a main embodiment of the invention the raw starch contains or even consists essentially of rice starch. In a preferred embodiment the raw rice starch is a native rice starch. In a particular variant thereof it is high amylose rice starch, preferably comprising at least 15, 16, 17, 18, 19, or even at least 20% amylose. An example of such a native rice starch having high amylose content is the product Remy B7 (supplier: Beneo Remy, BE). In another preferred embodiment the raw starch is not a native starch but a modified starch, whereby the modification should not lead to significant disruption of the granular structure of the starch.

In a preferred embodiment of the invention, the particle size distribution of the starch granules in the raw starch is such that at least 60 or 70 wt. % of the granules have a size lying between 2 µm and 8 µm. More preferably, at least 75, 80, or even at least 85 wt. % or essentially all of the granules have a size lying between 2 µm and 8 µm. Rice starch typically satisfies these criteria on granule size. It has been found that starches with considerably larger granules are less advantageous in delivering the same effect to a sugar-reduced frosting. Starches with granule size above 10 µm or even above 8 µm are preferably essentially excluded from the scope of the invention. The raw starch is preferably added to the composition in dry powdered form. As is known, when raw starch is provided in the form of a powder, the powder particles are then typically much bigger than the individual starch granules. In a preferred embodiment of the invention, the raw starch is provided in the form of a powder whereby the $D_{50}$ is at most 300 µm. As is known, the expression that a collection of particles has a '$D_\alpha$ of β' means that α wt. % of all particles in the collection has a size of at most β. The size determination of the starch particles as meant herein is done via sieving. Preferably, the $D_{50}$ is at most 275, 250, 225, 200, 175, 150, 125, 100, or 75 µm.

The composition of the invention may further comprise additional components and additives which contribute to the processability of the frosting syrup and/or the organoleptic and/or sensoric properties, appearance and taste of the frosted cereal product, such as colouring agents, binders, viscosity modifiers, crystalline modifiers, aroma, taste enhancing agents, preservatives, antioxidants and the like.

A preferred additional compound in the sugar-reduced frosting composition is an intensive sweetener, also referred to as high intensity sweetener. The intensive sweetener may be present in an amount of 0.001 to 1%, in particular 0.02 to 0.8%, preferably 0.01 to 0.5%, most preferably 0.1 to 0.3% by weight of dry matter in the frosting composition. In preferred embodiments the high intensity sweetener is selected from the group consisting of dulcin, thaumatin, stevioside, rebaudioside A, neohesperidin dihydrochalcone, acesulfam K, aspartame, sodium cyclamate, saccharin, glycyrrhicine, neotame, naringin dihydrochalcone, alitame, monellin, sucralose, and the like compounds and combinations thereof.

The composition according to the invention may further comprise dietary fibres, preferably soluble dietary fibres. Particular embodiments thereof are β-glucan, galactooligosaccharide, oligofructose and inulin, preferably oligofructose and inulin and their mixtures. Dietary fibres may be present in an amount of 1 to 40%, in particular 5 to 30%, by weight of dry matter in the frosting composition.

In a further preferred embodiment, the composition according to the invention may further comprise at least one additive. The additive is selected from the group consisting of sweetening agents, flavouring agents, spices, dairy products, prebiotics, synbiotics, probiotics, cacao containing products, chocolate, L-carnitine, omega 3 fatty acids, fats, supplements, emulsifiers, food grate acids, stabilizers, sediments, mineral nutrients, binding agents, dyes and preservatives.

According to the invention, the inventive cereal products can additionally be enriched with natural or synthetic vitamins selected from the group consisting of vitamin A, vitamin B1, vitamin B2, vitamin B3, vitamin B5, vitamin B6, vitamin B12, vitamin B complex, vitamin C, vitamin D, vitamin E, vitamin F and vitamin K. The cereal products according to the present invention may additionally comprise mineral nutrients and trace metals.

The composition according to the invention may additionally comprise probiotics. In the context of the present invention, a "probiotic" shall mean a microbial additional component, which promotes the health of a person or animal consumer by stabilizing or improving the microbial composition of the digestive tract. Probiotic microorganisms that may be added to the inventive composition are selected from the group consisting of Bifidobacteria such as the strains B. adolescentis, B. animalis, B. bifidum, B. longum, B. thermophilum; *Enterococci*; *Lactobacilli* such as the strains Lb. acidophilus, Lb. brevis, Lb, casei, Lb. cellobiosus, Lb. crispatus, Lb. delbrueckii subsp. Bulgaricus, Lb. fermentum, Lb. GG, Lb. johnsonii, Lb. lactis, Lb. plantarum, Lb. reuteri, Lb. rhamnosus, Lb. salivarius; *Bacillus cereus* toyoi; *Bacillus cereus*; *Leuconostoc*; *Pediococcus acidilactici*; *Propionibacterium*; *Streptococci* such as the strains S. cremoris, S. infantarius, S. intermedius, S. lactis, S. salivarius subsp. thermophlius (see also Fuller, J. Appl. Bacterioi. (1989)). Preferred probiotics are bacteria of the *Lactobacillus* and *Bifidobacterium* species.

In the context of the present invention, "synbiotics" shall mean a mixture of at least one prebiotic and at least one probiotic, which promotes the health of the human or animal consumer by improving the survival rate and increasing the number of health-promoting live microbial organisms in the gastrointestinal tract, particularly by selectively stimulating the growth and/or metabolic activity of the microbial organisms. In a further preferred embodiment synbiotics are used as additives.

The composition according to the may further comprise an additive in the form of a fatty component, for example cocoa mass, hydrogenated or non-hydrogenated vegetable oil or the like or, for example, a fat substitute.

The composition of the invention may further comprise one or more sugar alcohols which may substitute parts of the one or more sugars, in particular sucrose, i.e. the major bulking compound of the composition for frosting. Sugar alcohols that may be present in the composition are selected from mono- or disaccharide alcohols and are preferably chosen from the group consisting of maltitol, xylitol, sorbitol, erythitol, mannitol, lactitol, and isomalt or mixtures thereof. A particularly preferred sugar alcohol composition is isomalt, which may be in the form of the racemic mixture of 1,6-GPS (1,6-O-α-D-glucopyranosyl-D-sorbitol), preferably present in the isomalt in an amount of 43 to 57% by dry weight, and 1,1-GPM (1-O-α-D-glucopyranosyl-D-mannitol), preferably present in an amount of 57 to 43% by dry weight, or in the format GPS enriched isomalt (Isomalt GSTM), which is a mixture of 72 to 78%, preferably 75%, by dry weight of 1,6-GPS and 22 to 28%, preferably 25%, by dry weight of 1,1-GPM, or mixtures of 1,1-GPM, 1,6-GPS and 1,1-GPS (1-O-α-D-glucopyranosyl-D-sorbitol). The one or more sugar alcohols may be present in a total amount of 1 to 40% by weight, preferably 15 to 35% by weight of the dry frosting.

In a particularly preferred embodiment, the sugar alcohol is isomalt. In a further particularly preferred embodiment, the sugar alcohol is Isomalt GS.

In a further preferred embodiment of the present invention, the composition for frosting of the cereals is essentially sucrose-free, i.e. the dry matter of the composition for frosting comprises less than 0.5 wt. % of sucrose.

Another embodiment of the present invention relates to a frosting composition, which comprises no significant amount of free or of added sugar. Such an embodiment may mainly comprise one or more of the aforementioned sugar alcohols as the major bulking component. In such an embodiment the sugar alcohol may be present in an amount of 20 to 90% by weight of the dry frosting.

In a preferred embodiment of the invention, the frosting does not contain $TiO_2$ or other minerals for the aim of creating or enhancing the frosted appearance of the frosting.

The composition of the present invention can take the form of a dry mixture; frequently, however, it is preferred that the actual application of the composition to the cereal base is done by means of applying a liquid, preferably aqueous, composition to the cereal base. The present invention thus also concerns a frosting syrup for the coating of a cereal base, which, after having been applied to the cereal base and subsequently dried, results in a frosted cereal product. The frosting syrup according to the invention comprises a liquid solvent, in particular water, and the composition for frosting of the invention, preferably in an amount of from 65 to 85 wt. %, more particular in an amount of from 78 to 81 wt. %, calculated on the syrup as a whole. The frosting syrup according to the invention can be easily processed in a standard coating or frosting apparatus and can easily replace typical known frosting syrups without the need of considerable adaptation of the frosting apparatus and the frosting process.

The invention further relates to a method for preparing a frosting syrup, comprising the steps of adding a sugar and a raw starch to an aqueous system at a temperature lying between 0° C. and 120° C., preferably between 20 and 110, 100, or 90° C. In a preferred embodiment, the raw starch is only added to the aqueous system after essentially all of the sugar has been added and dissolved first; this has the advantage that any risk of gelification of the raw starch is reduced, in particular if the preparation of the frosting syrup is done at a temperature slightly below, at, or even above the specific gel point of the raw starch.

The present invention also concerns the use of the herein identified raw starch to promote or enhance the formation of a crystalline frosting in a sugar-reduced or sucrose-reduced, or sugar-free or sucrose-free composition for frosting of a cereal base. Particularly, the raw starch is added to a sucrose—or sugar-reduced or sucrose—or sugar-free frosting composition in powdered form in order to form a ready-mix frosting composition, or is added in powdered form during the preparation of the frosting syrup, before or as part of the step of coating the cereal base.

In the frosted cereal product according to the invention, the weight ratio between the cereal base and the frosting lies between 1:0.05 and 1:2. The weight ratio should be at least 1:0.05 in order to make sure that a frosted appearance can be achieved; preferably, the weight ratio is at least 1:0.1, 1:0.2, or even 1:0.3. The weight ratio should be at most 1:2, preferably at most 1:1.5, 1:1.0, or at most 1:0.8. In a preferred embodiment of the invention the amount of the dry frosting in the end product, i.e. the frosted cereal product, is from 20 to 50 wt. %, preferably 30 to 45% by weight (dry matter).

According to the invention, the frosting consists of at least one layer and can consist of up to five layers. In contrast to coating processes that are often practised in the preparation of certain confectioneries like chewing gums—where it is not uncommon that the coating consists of 20, 30, or more layers—the frosting of the invention consists of a limited number of layers; this has the advantage that the typical and desirable inhomogeneous nature of a frosting can be achieved. More preferably, the frosting consists of one or only two layers, most preferably of only one layer. As meant herein, the term layer refers to the result of one combination of steps b) and c) as defined below.

If a frosting syrup according to the invention is prepared, it is typical that the raw starch does not have a strong tendency to dissolve in the prepared frosting syrup. Rather, the raw starch particles are typically essentially all suspended within the syrup. Depending on the mode of operation of the coating process, the viscosity and specific density of the syrup, in some instances additional measures may be required in order to keep the raw starch particles evenly distributed throughout the suspension. There are several common means available, including mechanical and physical-chemical measures, such as stirrers, emulsifiers, and viscosity modifiers.

The invention further relates to a method for the preparation of a frosted cereal product. The method comprises the following steps: in step a), a—preferably preheated—cereal base is provided. In a subsequent step b), a frosting syrup according to the present invention is applied to the cereal base such as to provide a coating on the cereal base. It is noted that even though the present invention comprises a coating step, it is not the objective of the invention to merely provide a coated product, but rather a product that has a further functionality so as to qualify as a frosted product. Simultaneously with, or subsequent to, step b), the coated cereal base is dried in a step c). Thus, step c) may be carried out at the same time as step b) or it may be carried out after step b) has been wholly or partially completed.

According to the invention, the combination of steps b) and c) may be repeated up to four times, so that ultimately the frosting consists of 1, 2, 3, 4, or 5 layers. In a preferred embodiment, the combination of steps b) and c) is repeated only once or even not repeated at all.

Upon completion of the execution of the desired number of combinations of steps b) and c), the frosted cereal product is formed. Crystallisation in the coating can and preferably does take place in the process of the invention, in particular during step c). The said crystallization in the coating, combined with the effect of the raw starch, then leads to the typical "frosted" appearance of the coat. The drying in step c) is preferably accomplished by placing the coated cereal product in air, preferably hot air, in particular in a hot air stream, preferably in a constant hot air stream. The air preferably has a temperature of from 20 to 80° C., preferably 50 to 70° C., preferably from 40 to 70° C., preferably from 55 to 65° C., more particular of 60° C.

In a preferred embodiment, the pieces of coated cereal base are kept in motion during the drying in step c).

In a preferred embodiment of the present invention the cereal product is, prior to or during step a), preheated to a temperature lying between 50 and 90° C. A typical heating time is 5 to 7 minutes, preferably about 5 minutes. Preferably, the cereal product is heated to a temperature of from 70 to 90° C., more preferably from 85 to 90° C.

In a preferred embodiment of the present invention, the frosting syrup according to the invention is applied in step b) to the cereal product multiple-times, preferably two to 50 times, preferably 5 to 30 times, most preferably 10 to 25 times, before step c) is done. In an alternative embodiment of step b), however, the frosting syrup is applied in one application.

In the method according to the present invention it is preferred that the temperature of the frosting syrup in steps b) and c) is at most 120, 110, 100, or 90° C., or even does not exceed 85° C. With reference to the foresaid this is preferred in order to avoid any significant gelification of the raw starch within the frosting syrup before and after the coating of the cereal product in order to maintain one of the functions of the raw starch, which is to aid or promote a crystallization of the sugar-reduced or sugar-free coating. Accordingly, the frosting syrup, as it is applied to the cereal product, preferably has a temperature of from 50 to 90° C., more particular from 65 to 90° C., more particular from 65 to 85° C.

The coating in step b) may be performed in a single step. In alternative preferred embodiments, however, the coating is done in subsequent steps.

The frosting preferably represents from 5 to 50% by weight of the dry matter of the frosted cereal product. For example, 1 kg uncoated cereal product may be coated with 600 g of frosting syrup. In preferred variants, the frosting represents from 10% to 50%, preferably from 12% to 40%, preferably from 15% to 35%, preferably from 30 to 40% by weight of the dry matter of the frosted cereal product.

The invention will be explained in detail on the basis of the following examples, without being limited thereto.

EXAMPLE 1

1.1 Production of Frosted Corn Flakes

In a driamcoater (a laboratory scale spin coater) 600 g of a composition for frosting, with a temperature of 90° C., was sprayed in portions of 50 g onto 1 kg of corn flakes. The corn flakes had been preheated for 5 minutes at 90° C. The recipes of the composition for frosting can be found in table 1. The time between two spraying steps was 2 minutes. After the entire amount of the composition for frosting had been sprayed onto the preheated corn flakes, the coated corn flakes were dried for 10 minutes at 60° C. During the whole process the corn flakes were turned at a very low speed of the driamcoater.

The technical data of commercially available frosted cornflakes (Kellogg's Frosties™) are as follows:

weight gain: 1.96, dry substance of 96.56 and $a_w$=0.211

TABLE 1

| Ingredients of the composition for frosting [% w/w] | Ref. | A | B | C | D |
|---|---|---|---|---|---|
| water | 20.00 | 20.00 | 20.00 | 20.00 | 20.00 |
| sucrose | 80.00 | 51.92 | 52.94 | 52.94 | 54.00 |
| isomalt GS | 0.00 | 0.00 | 27.00 | 0.00 | 0.00 |
| oligofructose (Orafti L90) | 0.00 | 22.00 | 0.00 | 0.00 | 0.00 |
| raw rice starch (Remy B7) | 0.00 | 6.00 | 0.00 | 0.00 | 25.90 |
| isomaltulose | 0.00 | 0.00 | 0.00 | 27.00 | 0.00 |
| intensive sweetener (Stevia REB-A 97%) | 0.00 | 0.08 | 0.06 | 0.06 | 0.10 |
| total | 100.00 | 100.00 | 100.00 | 100.00 | 100.00 |
| Dry matter composition (%) | 79.2 | 73.86 | 78.93 | 78.93 | 78.94 |
| calculated sweetness (sucrose = 100) | 80 | 80 | 81.4 | 80 | 79 |
| total sugar [% w/w in end product] | 34.6 | 26.7 | 24.7 | 25.3 | 29.3 |

1.2 Properties of the Produced Frosted Corn Flakes

Following measurements were performed for the determination of:

Moisture content after storage of 24 h at room temperature:
Sartorius MA35, 100° C.
5 g of the frosted corn flakes
5 measurements and average
Water activity: Aqualab CX-2
5 measurements and average
Milk absorption: 4-6g of the frosted corn flakes in little sieve
Soaked for 3 min. in semi skimmed milk
Weight gain was measured after soaking period
Appearance after 24h open container The properties of the produced frosted corn flakes are summarized in table 2.

TABLE 2

| | Ref. | A | B | C | D |
|---|---|---|---|---|---|
| appearance after storage of 24 h | loose | solid block | solid block | solid block | loose |
| appearance of frosting | white | no frosting | no frosting | no frosting | bright white |
| level of frosting | high | no | no | no | very high |
| frosting per product core [% w/w] | 20.1 | 23.0 | 18.7 | 6.7 | 33.8 |
| weight gain [times initial weight of the core product] | 1.83 | 1.65 | 1.62 | 1.50 | 1.61 |
| dry matter of the frosted corn flakes [% w/w] | 96.38 | 95.70 | 96.97 | 96.01 | 95.59 |
| water activity of the frosted corn flakes [$a_w$] | 0.279 | 0.299 | 0.275 | 0.296 | 0.332 |

In this Example 1, composition and frosted corn flakes 'D' are according to the invention; these frosted corn flakes are reduced in sucrose yet show—in contrast to the compositions and corn flakes 'A', 'B', and 'C', all not according to the invention—good properties in terms of appearance and storage characteristics.

EXAMPLE 2

2.1 Production of Frosted Corn Flakes

In a driamcoater (a laboratory scale spin coater) 1080 g of a composition for frosting, with a temperature of 90° C., was sprayed in portions of 50 g onto 1 kg of corn flakes. The corn flakes had been preheated for 5 minutes at 90° C. The recipes of the compositions for frosting can be found in table 3. The time between two spraying steps was 2 minutes. After the entire amount of the composition for frosting has been sprayed onto the preheated corn flakes the coated corn flakes were dried for 10 minutes at 60° C. During the whole process the corn flakes were turned at a very low speed of the driamcoater.

TABLE 3

| Ingredients [% w/w] | Ref. | E | F |
|---|---|---|---|
| water | 20.00 | 20.00 | 20.00 |
| sucrose | 80.00 | 50.91 | 50.91 |
| isomalt GS | 0.00 | 0.00 | 13.00 |
| oligofructose (Orafti L90) | 0.00 | 13.00 | 0.00 |
| raw rice starch (Remy B7) | 0.00 | 16.00 | 16.00 |

TABLE 3-continued

| Ingredients [% w/w] | Ref. | E | F |
|---|---|---|---|
| intensive sweetener (Stevia REB-A 97%) | 0.00 | 0.09 | 0.09 |
| total | 100.00 | 100.00 | 100.00 |
| dry matter of syrup (%) | 79.2 | 75.92 | 78.91 |
| calculated sweetness power (Sucrose = 100) | 80 | 78.6 | 79.9 |
| total sugar [% w/w in end product] | 34.6 | 43.3 | 36.7 |

2.2 Properties of the Produced Frosted Corn Flakes

Following measurements were performed for the determination of:
Moisture:
  Sartorius MA35, 100° C.
  5g of the frosted corn flakes
  5 measurements and average
Water activity:
  Aqualab CX-2
  5 measurements and average
Appearance after 24h open container
Viscosity of the compositions for frosting: Bohlin viscosity, CP4°/40mm, shear rate 40 1/s at 90° C., every sample is measured twice. The viscosities are listed in Table 4.

The technical features of the produced frosted corn flakes are summarized in table 5.

TABLE 4

|  | Ref. | E | F |
|---|---|---|---|
| Viscosity (mPa · s) | 218 | 240 | 399 |

TABLE 5

|  | Ref. | E | F |
|---|---|---|---|
| appearance after storage of 24 h | loose | loose | loose |
| appearance of frosting | white | white | white |
| level of frosting | high | high | high |
| dry matter of the end product [% w/w] | 96.38 | 95.3 | 95.6 |
| water activity [$a_w$] | 0.279 | 0.393 | 0.388 |

In this Example 2, compositions and frosted corn flakes 'E' and 'F' are according to the invention; these frosted corn flakes are reduced in sucrose yet show good properties in terms of appearance and storage characteristics.

EXAMPLE 3

A rotating, cylindrically shaped drum having heated walls and a spraying device installed along the central axis of the drum was continuously filled on one end with corn flakes via a conveyor belt. The drum rotated continuously and its wall was heated to 80° C. The flakes were continuously discharged at the opposite end from where they had been fed. As soon as a desired quantity of flakes had been fed into the drum, a specified amount of heated coating syrup was sprayed onto the corn flakes in one layer. The temperature of the frosting syrup was 110° C. Before being discharged, the corn flakes had the chance to dry in the drum as it kept rotating. At any one time during the production, about 25 kg of cereal base (corn flakes) was present in the drum. The composition of the frosting syrups used is given in Table 6; in all cases, the sucrose or isomaltulose was dissolved into the water prior to the addition of the raw rice starch so as to avoid gelification of the starch by ensuring a high relative gel point. The throughput in cereal base was up to about 100 kg per hour; the flow of frosting syrup was up to about 50 kg per hour.

TABLE 6

| Ingredients of the frosting syrup [% w/w] | G | H | I |
|---|---|---|---|
| water | 20.00 | 20.00 | 20.00 |
| sucrose | 53.00 | 53.00 | 53.00 |
| isomaltulose (Palatinose ™ PST-N) | 0.00 | 0.00 | 10.00 |
| inulin (Orafti ™ GR) | 10.00 | 0.00 | 0.00 |
| raw rice starch (Remy ™ B7) | 17.00 | 27.00 | 17.00 |
| total | 100.00 | 100.00 | 100.00 |

A sample of frosting syrups 'G', 'H' and 'I' was evaluated under the microscope; even though the syrup was maintained at 110° C., the starch granules clearly showed a Maltese cross, indicating that no gelification had taken place in any one of the syrups.

Frosted corn flakes 'G', 'H' and 'I' according to the invention were successfully produced. The weight ratio between cereal base and frosting was determined to be 60:24 for all three types of frosted corn flakes. Some properties of the frosted corn flakes are given in Table 7

TABLE 7

|  | G | H | I |
|---|---|---|---|
| weight increase (milk absorption) (%) | 40 | 80 | 60 |
| water activity [$a_w$] | 0.429 | 0.166 | 0.175 |

The weight increase as given in Table 7 was determined by soaking the frosted corn flakes in semi-skimmed milk for 3 minutes and comparing the weight of the soaked frosted corn flakes with the weight of the frosted corn flakes prior to soaking. The increase is expresses as percentage of the weight of the frosted corn flakes prior to soaking.

The invention claimed is:

1. A dry frosted cereal product, comprising a cereal base and a frosting on the cereal base, wherein:
  the frosting is a titanium dioxide-free material consisting essentially of a composition comprising a co-applied mixture of sucrose in an amount of at most 70% by weight (dry matter of the frosting), and starch granules embedded in the frosting wherein the starch granules comprise granules of raw uncooked native rice starch in which at least 70 wt.% of the raw uncooked native rice starch in the composition is in the form of particles having a size lying between 2 μm and 8 μm, and which exhibit, when viewed under polarized light a Maltese cross effect, in an amount of at least 10% by weight (dry matter of the frosting);
  the weight ratio between the cereal base and the frosting lies between 1:0.05 and 1:2; and
  the frosting consists of at most 5 layers.

2. The frosted cereal product according to claim 1, wherein the raw uncooked native rice starch in the composition has a specific gel point of at least 65° C.

3. The frosted cereal product according to claim 1, wherein the composition further comprises an intensive sweetener, wherein the intensive sweetener is present in an amount of 0.001 to 1%, wherein the intensive sweetener is selected from the group consisting of dulcin, thaumatin, stevioside,rebaudioside A, neohesperidin dihydrochalcone, acesulfam K, aspartame, sodium cyclamate, saccharin, glycyrrhicine, neotame, naringin dihydrochalcone, alitame, monellin, sucralose, and combinations thereof.

4. A frosted cereal product according to claim 1, wherein the cereal base is a breakfast cereal.

5. A frosted cereal product according to claim 1, wherein the amount of raw uncooked native rice starch in the frosting is at least 20% by weight.

6. The frosted cereal product according to claim 1, wherein the amount of sucrose in the frosting is between 15 and 65% by weight.

7. The frosted cereal product according to claim 1, wherein the amount of sucrose in the frosting is between 15 and 60% by weight.

8. The frosted cereal product according to claim 1, wherein the amount of raw uncooked native rice starch in the frosting is at least 30% by weight.

9. A method of preparing a titanium dioxide-free frosting syrup consisting essentially of raw uncooked native rice starch and sucrose, comprising the steps of adding sucrose and a raw uncooked native rice starch to an aqueous system at a temperature lying between 0° C. and 120° C., wherein the raw uncooked native rice starch comprises granules of raw uncooked native starch in the form of particles having a size lying between 2 μm and 8 μm, and which exhibit, when view under polarized light a Maltese cross effect, such that the amount of sucrose in the syrup is at most 70%(dry matter) and the amount of raw uncooked native rice starch in the syrup is at least 10% (dry matter).

10. The method according to claim 9, wherein the raw uncooked native rice starch is only added to the aqueous system after essentially all of the sucrose has been added and dissolved first.

11. A method for the preparation of a frosted cereal product, comprising the steps of:
    a) providing a cereal base,
    b) applying a frosting syrup obtained by the method of claim 9 to the cereal base to provide a coating onto the cereal base, and
    c) drying the coated cereal base, to form the frosted cereal product, whereby step c) may be executed during the execution of step b) or subsequent to it, whereby the combination of steps b) and c) is optionally repeated up to four times, and whereby the weight ratio between the cereal base and the frosting in the frosted cereal product lies between 1:0.2 and 1:2.

12. The method according to claim 11, wherein the cereal base in step a) is preheated to a temperature lying between 50 and 90° C.

13. The method according to claim 12, wherein in steps b) and c) the temperature of the syrup does not exceed 90° C.

14. The method according to claim 11, wherein in steps b) and c) the temperature of the syrup does not exceed 90° C.

15. The method according to claim 11, wherein the drying step c) is executed by air having a temperature lying between 20 and 80° C.

16. The method according to claim 11, wherein the frosting syrup in step b) is prepared by adding the raw uncooked native rice starch to the aqueous system after essentially all of the sucrose has been added and dissolved first.

17. The method according to claim 16, wherein the cereal base in step a) is preheated to a temperature lying between 50 and 90° C.

18. The method according to claim 16, wherein in steps b) and c) the temperature of the syrup does not exceed 90° C.

19. The method according to claim 16, wherein the drying step c) is executed by air having a temperature lying between 20 and 80° C.

* * * * *